(12) United States Patent
Booth et al.

(10) Patent No.: US 7,837,263 B2
(45) Date of Patent: Nov. 23, 2010

(54) VEHICLE SEAT CONSTRUCTION

(75) Inventors: Daniel W. Booth, Warren, MI (US); Robert L. Demick, Macomb Township, MI (US); Jeffrey J. Kilmer, White Lake, MI (US); Eric M. Bruckbauer, Detroit, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 179 days.

(21) Appl. No.: 11/762,939

(22) Filed: Jun. 14, 2007

(65) Prior Publication Data

US 2008/0309143 A1    Dec. 18, 2008

(51) Int. Cl.
A47C 31/02    (2006.01)

(52) U.S. Cl. ............... 297/218.1; 297/218.2; 297/218.3

(58) Field of Classification Search ............. 297/218.1, 297/218.2, 218.3, 218.5
See application file for complete search history.

(56) References Cited

U.S. PATENT DOCUMENTS

| | | | | |
|---|---|---|---|---|
| 4,834,451 A | * | 5/1989 | Meunier et al. | 297/218.2 |
| 4,865,383 A | * | 9/1989 | Sbaragli et al. | 297/218.2 |
| 5,486,252 A | | 1/1996 | Wong | |
| 5,733,001 A | * | 3/1998 | Roberts | 297/218.1 |
| 5,768,758 A | * | 6/1998 | Deignan et al. | 297/218.3 X |
| 5,964,017 A | * | 10/1999 | Roberts | 297/218.1 X |
| 6,048,025 A | * | 4/2000 | Tillner | 297/218.1 |
| 6,152,534 A | * | 11/2000 | Maeda et al. | 297/218.3 X |
| 6,156,406 A | | 12/2000 | Rock et al. | |
| 6,375,269 B1 | * | 4/2002 | Maeda et al. | 297/218.2 X |
| 6,632,756 B1 | * | 10/2003 | Waldrop et al. | 297/218.1 X |
| 6,920,902 B2 | * | 7/2005 | Majaury et al. | 139/383 A |
| 6,964,453 B1 | * | 11/2005 | Flegal et al. | 297/452.6 |
| 7,128,371 B2 | * | 10/2006 | Kawasaki et al. | 297/218.1 X |
| 7,134,718 B2 | * | 11/2006 | Yasuda et al. | 297/218.1 X |
| 7,134,730 B2 | * | 11/2006 | Flegal et al. | 297/452.6 |
| 7,287,305 B2 | * | 10/2007 | Bednarski | 297/218.3 X |
| 7,481,489 B2 | * | 1/2009 | Demick | 297/218.1 |
| 7,559,100 B2 | * | 7/2009 | Pedde et al. | 297/218.2 X |
| 2009/0085384 A1 | * | 4/2009 | Galbreath et al. | 297/218.1 |

FOREIGN PATENT DOCUMENTS

EP    359643 A1 *    3/1990

* cited by examiner

*Primary Examiner*—Rodney B White
(74) *Attorney, Agent, or Firm*—Quinn Law Group, PLLC

(57) ABSTRACT

A vehicle seat includes a foam cushion, a flexible cover at least partially defining the outer surface of the vehicle seat, and a spacer fabric. The spacer fabric includes a first fabric panel operatively connected to the flexible cover, a second fabric panel operatively connected to the foam cushion, and an interconnecting layer. The interconnecting layer resiliently interconnects the first and second fabric panels.

16 Claims, 2 Drawing Sheets

VEHICLE SEAT CONSTRUCTION

TECHNICAL FIELD

This invention relates to vehicle seats having a flexible cover mounted with respect to a foam cushion via spacer fabric.

BACKGROUND OF THE INVENTION

A vehicle seat typically includes foam cushions that separate an occupant from a rigid frame and that are compressible to conform to the contours of the occupant so that the occupant is comfortably supported. Flexible covers, such as fabric, leather, or vinyl, cover the foam cushions and form the outer surface of the seat. A vehicle seat is typically characterized by a lower seat portion and a seatback portion. The lower seat portion defines a generally horizontal surface to support an occupant, and the seatback portion defines a generally vertical surface to support the back of an occupant.

Certain vehicle seats are constructed such that the flexible covers are mounted directly to the foam cushions by adhesive distributed across a large percentage of the contact area between the covers and the cushions. Accordingly, the covers closely follow the contours of the cushions, thereby providing the seats with a "molded" appearance.

Prior art techniques to bond a contoured seat cover to a seat cushion include usage of a thermally-activated adhesive such as a polyamide hot melt for the bonding operation. In certain seat styles where it is desirable to bond a large surface area of the cover to the seat cushion, a prior art technique includes spraying a hot melt adhesive on the seat cushion or cover and then joining the two members together. Prior art techniques also include applying adhesive between the cover and the cushion and then use heated dies or steam. The use of steam is not compatible with leather or vinyl seat cover because steam cannot pass through impermeable covers.

SUMMARY OF THE INVENTION

A vehicle seat is provided that includes a foam cushion, a flexible cover at least partially defining the outer surface of the vehicle seat, and a spacer fabric. The spacer fabric has a first fabric layer operatively connected to the flexible cover, a second fabric layer operatively connected to the foam cushion, and an interconnecting layer. The interconnecting layer interconnects the first and second fabric layers and resiliently biases the first and second fabric layers from one another. The construction of the vehicle seat provided herein enables the cover to generally follow the contours of the seat cushion so that the vehicle seat is characterized by a "molded" or "sculptured" appearance.

The vehicle seat provided herein improves upon prior art seats having a molded appearance because the spacer fabric separates the foam cushion and the cover, so that any blemishes in the surface of the foam cushion, or other seat components such as occupant sensors, are not visible through the cover. The vehicle seat provided herein also improves upon the prior art by enabling the use of a variety of fastening elements, not merely adhesive bonding as used in the prior art, to secure the cover with respect to the cushion because the spacer fabric obscures the fastening elements such that they are not visible through the cover.

The vehicle seat provided herein also enables a molded appearance with a cost-effective "cut and sew" cover material instead of a cover with elongation characteristics required to stretch and conform to the contoured surfaces of the cushion; furthermore, the vehicle seat provided herein enables the use of a wider variety of cover materials compared to the prior art, including cloth, leather, vinyl, etc. Cover registration can be controlled on four sides to reduce skewing of the cover.

A vehicle seat is also provided that includes a lower seat portion, a seatback portion operatively connected to the lower seat portion, a foam cushion, and a spacer fabric. The spacer fabric includes a first fabric panel, a second fabric panel operatively connected to the foam cushion, and a plurality of pile yarns resiliently biasing the first and second fabric panels from one another. The first fabric panel defines at least part of the outer surface of at least one of the lower seat portion and the seatback portion.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
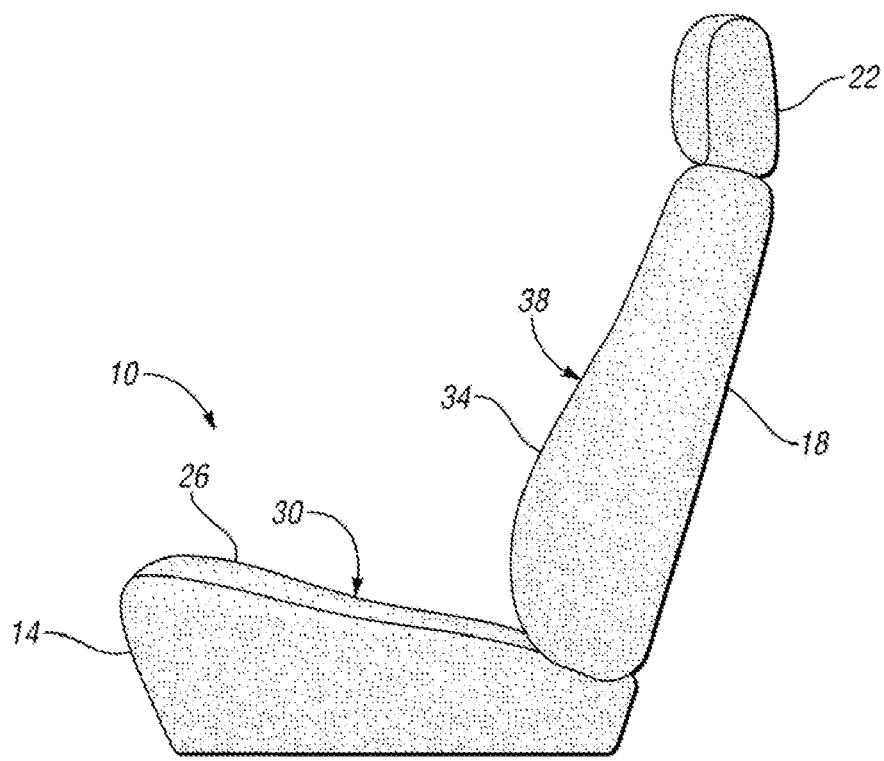
FIG. 1 is a schematic, side view of a vehicle seat assembly, including a lower seat portion and a seatback portion.

Referring to FIG. 1, a vehicle seat assembly 10, i.e., a seat for installation in a vehicle, is schematically depicted. The vehicle seat assembly 10 includes a lower seat portion 14, a seatback portion 18, and a headrest 22. The lower seat portion 14 includes a flexible cover 26 that defines at least part of the outer surface of the lower seat portion 14, and, more particularly, defines a generally horizontal surface 30 for supporting an occupant. The seatback portion 18 is mounted with respect to the lower seat portion 14; for example, the seatback portion 18 may be rigidly mounted with respect to the lower seat portion 14, or pivotably mounted with respect to the lower seat portion 14 such that an occupant can adjust the angle formed between the seatback portion 18 and the lower seat portion 14.

The seatback portion 18 includes a flexible cover 34 that defines at least part of the outer surface of the seatback portion 18, including surface 38, which is generally vertically oriented to provide support for the back of an occupant. The headrest 22 is mounted with respect to the seatback portion 18 adjacent the upper edge of the seatback portion 18.

Figure 2:
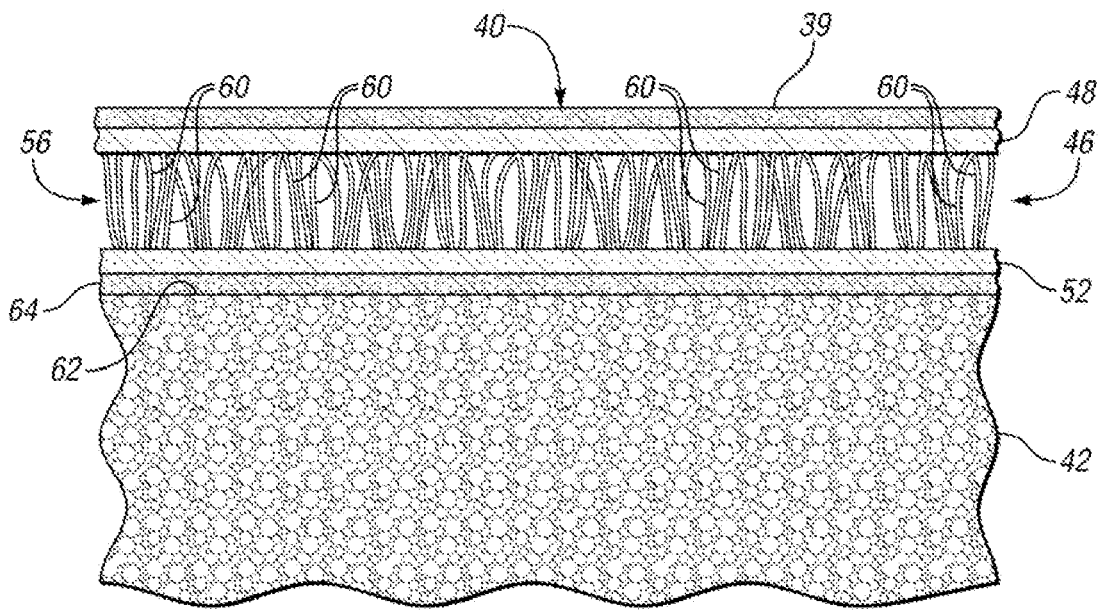
FIG. 2 is a schematic, cross-sectional view of a first seat configuration for use in the seat assembly of FIG. 1.

In a first exemplary embodiment of the seat assembly 10, the lower seat portion 14 and the seatback portion 18 are characterized by the seat construction shown in FIG. 2. Referring to FIG. 2, flexible cover 39, defining surface 40, is mounted with respect to a foam cushion 42 via a three dimensional spacer fabric 46. Flexible cover 39 is representative of flexible covers 26 and 34, and surface 40 is representative of surfaces 30 and 38. Those skilled in the art will recognize a variety of materials that may be employed to form the cushion 42, such as polyurethane, polypropylene, etc.

The spacer fabric 46 is flexible and includes a first fabric panel 48 and a second fabric panel 52 that is generally parallel with the first fabric panel 48. The spacer fabric 46 also includes an interconnecting layer 56 that interconnects the first and second panels 48, 52 and that has sufficient stiffness to resiliently bias the first and second fabric panels 48, 52 apart from one another. In a preferred embodiment, the interconnecting layer 56 is comprised of a plurality of pile yarns 60. The pile yarns 60 interconnect the first and second fabric panels 48, 52 and resiliently bias the first and second fabric panels 48, 52 apart from one another.

Thus, when the spacer fabric 46 is unstressed, the pile yarns 60 will maintain the first and second fabric layers 48, 52 a predetermined distance from one another. When a compressive stress is applied to the spacer fabric 46, such as by an occupant acting on surface 40, the pile yarns 60 will bend in response so that the distance between the first and second fabric panels 48, 52 is less than the predetermined distance; when the compressive stress is removed, the pile yarns 60 will return to their pre-stress shape thereby moving the first and second fabric panels 48, 52 to their predetermined distance from one another.

Those skilled in the art will recognize a variety of materials that may be employed to form the resilient pile yarns 60 within the scope of the claimed invention, such as polyester, acrylic, nylon, etc. The pile yarns 60 are preferably monofilament, but may have other configurations within the scope of the claimed invention. Although the interconnecting layer 56 is characterized by pile yarns 60 in the embodiment depicted, other interconnecting layer configurations may be employed with the scope of the claimed invention, such as tubes, pleats, etc.

Although any fabric panel construction may be employed within the scope of the claimed invention, in an exemplary embodiment, the spacer fabric 46 is a three-dimensional knit structure in which the first and second fabric panels 48, 52 are comprised of polymeric yarns, such as polyester, acrylic, or nylon, that are knitted such that the panels are characterized by a net-like appearance with relatively large openings (not shown) formed therein. Exemplary, commercially available spacer fabrics include 3MESH® from Muller Textil of Germany, and CUBIT® from Asahi Kasei Fibers Corporation of Japan.

The flexible cover 39 is mounted to the first fabric panel 48, such as by sewing, adhesive bonding, etc., such that the cover 39 and the panel 48 are in direct contact with one another and the flexible cover 39 generally follows any contours of the first fabric panel 48. The second fabric panel 52 is mounted to surface 62 of the foam cushion 42 such that the panel 52 follows the general contour of the cushion surface 62. In the embodiment of FIG. 2, the panel 52 is mounted to the surface 62 of the cushion 42 via locally applied adhesive 64. The pile yarns 60 in the embodiment depicted ensure that the first fabric panel 48, and thus the flexible cover 39, generally follows the contours of the second fabric panel 52, and, accordingly, the general contour of the cushion 42.

Figure 3:
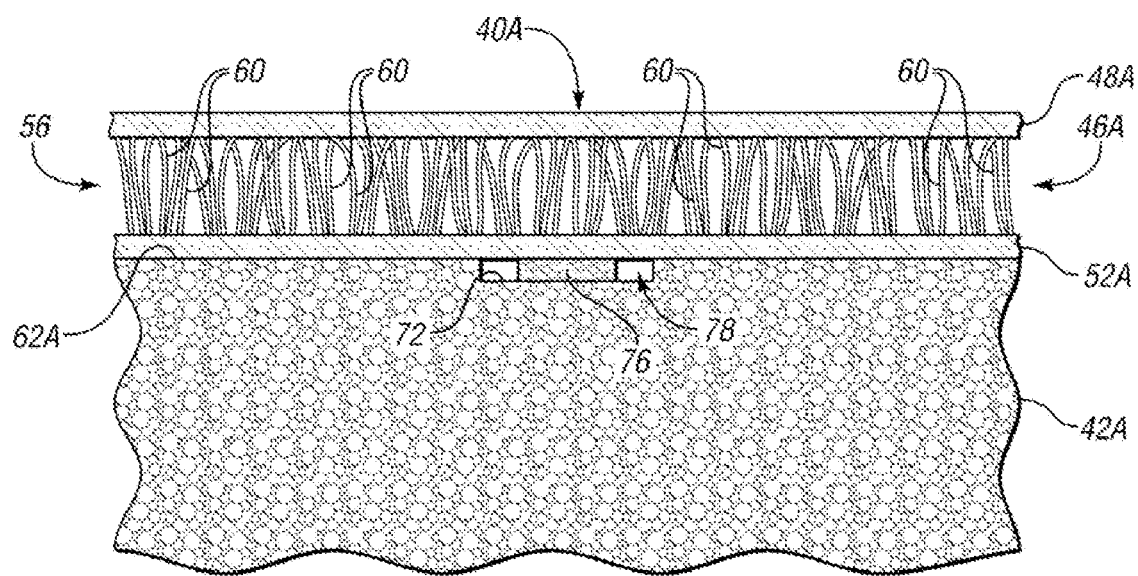
FIG. 3 is a schematic, cross-sectional view of a second seat configuration for use in the seat assembly of FIG. 1.

In a second exemplary embodiment of the seat assembly 10, the lower seat portion 14 and the seatback portion 18 are characterized by the seat construction shown in FIG. 3. Referring to FIG. 3, wherein like reference numbers refer to like components from FIG. 2, the spacer fabric 46A includes a first fabric panel 48A and a second fabric panel 52A that is generally parallel with the first fabric panel 48A. The spacer fabric 46A also includes an interconnecting layer 56 that includes a plurality of pile yarns 60 having sufficient stiffness to resiliently bias the first and second fabric panels 48A, 52A apart from one another.

The first fabric panel 48A defines the outer surface 40A of the seat, and thus the first fabric panel 48A acts as the flexible seat cover. The first fabric panel 48A is representative of flexible covers 26 and 34, and surface 40A is representative of surfaces 30 and 38. The cushion 42A defines a concavity, namely trench 72, that is open at the surface 62A of the cushion 42A. A first part 76 of a hook and loop fastening system 78 is at least partially disposed within the trench 72 and is mounted to the cushion 42A. The second fabric panel 52A contacts the surface 62A and spans the opening of the trench 72.

A second part of the hook and loop fastening system 78 is mounted to the second fabric panel 52A and is engageable with the first part 76 of the fastening system 78. In the embodiment depicted, fibers that are integrally formed with the second fabric panel 52A define the second part of the hook and loop fastening system 78; that is, the second fabric panel 52A is configured to engage the first part 76 of the hook and loop fastening system 78 to releasably mount the spacer fabric 46A to the cushion 42A. In an exemplary embodiment, the pile yarns 60 are configured to extend through the second panel 52A and form the hook portion of the system, and part 76 is configured to form the loop portion of the system.

The spacer fabric 46A is sufficiently flexible to follow the general contour of surface 62A to provide a molded or sculptured seat appearance, but has sufficient structure to span the trench 72 such that the existence of the trench does not affect the appearance of the outer surface 40A of the seat. Further, the spacer fabric 46A is sufficiently resilient such that the existence of the hook and loop fastening system 78 does not affect the appearance of the outer surface 40A. Alternatively, and within the scope of the claimed invention, the second part of the hook and loop fastening system 78 may be a separate member operatively connected to the second panel 52A.

Figure 4:
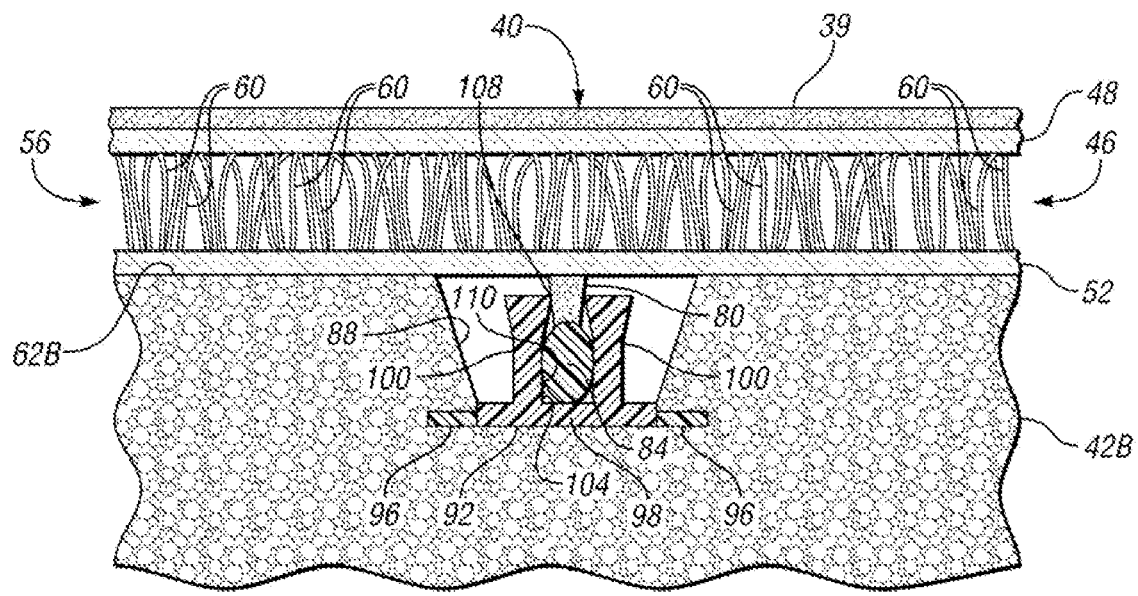
FIG. 4 is a schematic, cross-sectional view of a third seat configuration for use in the seat assembly of FIG. 1.

In a third exemplary embodiment of the seat assembly 10, the lower seat portion 14 and the seatback portion 18 are characterized by the seat construction shown in FIG. 4. Referring to FIG. 4, wherein like reference numbers refer to like components from FIGS. 2 and 3, flexible cover 39 defines surface 40 and is mounted with respect to foam cushion 42B via three dimensional spacer fabric 46.

The spacer fabric 46 includes a first fabric panel 48 and a second fabric panel 52 that is generally parallel with the first fabric panel 48. The spacer fabric 46 also includes an interconnecting layer 56 that includes a plurality of pile yarns 60 having sufficient stiffness to resiliently bias the first and second fabric panels 48, 52 apart from one another.

The flexible cover 39 is mounted to the first fabric panel 48, such as by sewing, adhesive bonding, etc., such that the cover 39 and the panel 48 are in direct contact with one another and the flexible cover 39 generally follows any contours of the first fabric panel 48. One end of a flexible member 80 is mounted to the second fabric layer 52, and the other end of the flexible member 80 is mounted to a generally rigid member 84. Member 84 is characterized by an elliptical cross section, as shown in FIG. 4. The cushion 42B defines a concavity 88 that is open at the surface 62B of cushion 42B. The cover 39 and the spacer fabric 46 extend across the concavity 88. As shown in FIG. 4, the cover 39 does not define a trench where the cover 39 and the spacer fabric 46 extend across the concavity 88. The flexible member 80 and the generally rigid member 84 extend into the concavity 88.

A clip 92 is mounted to the cushion 42B and at least partially disposed within the concavity 88. More specifically, the clip 92 includes two arms 96 that protrude from the base 98 of the clip 92 and that are encapsulated by the cushion 42B to retain the clip 92 with respect to the cushion 42B. The clip 92 also includes two arms 100 that are generally parallel to one another. The arms 100 cooperate with the base 98 of the clip 92 to define a channel 104. The channel 104 is characterized by an opening 108 such that the channel 104 is open in the direction of the second fabric panel 52 to receive member 84. The channel 104 is characterized by a terminal end portion 110 adjacent the base 98 and at the opposite end of the channel 104 from the opening 108.

The channel 104 is tapered such that the width of the channel 104 at opening 108 is narrower than the width of the channel 104 at the terminal end portion 110. That is, the distance between the arms 100 at the opening 108 is less than the distance between the arms 100 at the terminal end portion 110.

The channel 104 at the opening 108 is characterized by a predetermined width, which is less than the width of member 84. Member 84 is insertable into the channel 104 through the opening 108. Since the predetermined width of the channel 104 at the opening 108 is less than the width of member 84, insertion of the member 84 into the channel 104 causes deflection of the arms 100 away from each other such that the width of the channel 104 at opening 108 increases to accommodate the member 84. The arms 100 are resilient, and thus, when the member 84 has traversed the opening 108, the arms 100 return to their original positions with respect to one another so that the channel 104 at the opening 108 returns to the predetermined width. Accordingly, the member 84 is engageable with the clip 92 in a "snap fit" arrangement to retain the spacer fabric 46 with respect to the cushion 42B.

The fastening systems shown in FIGS. 2-4 are exemplary. Other fastening systems may be employed within the claimed invention. For example, a low profile clip may be molded into a foam cushion and configured to snap around knit bundles that form the second fabric panel; a fastener may be positioned within the spacer fabric and extend through the second fabric panel to engage with a complementary fastener mounted to the cushion, etc.

It should be noted that the embodiments of FIGS. 2 and 4, in which a separate member 39 forms the cover of the vehicle seat, are preferred embodiments when the cover is comprised of a material such as leather or vinyl. As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

The invention claimed is:

1. A vehicle seat comprising:
a foam cushion defining a concavity;
a flexible cover at least partially defining the outer surface of the vehicle seat;
a three dimensional spacer fabric having a first fabric panel operatively connected to the flexible cover, a second fabric panel operatively connected to the foam cushion and extending across the concavity, and an interconnecting layer that operatively interconnects the first and second fabric panels and that resiliently biases the first and second panels away from one another; and
a first fastening element mounted with respect to the foam cushion and being at least partially disposed within the concavity; said first fastening element operatively connecting the spacer fabric to the foam cushion;
wherein the foam cushion defines a cushion surface; wherein the concavity is open at the cushion surface; wherein the cover extends across the concavity; and wherein the cover does not define a trench where the cover extends across the concavity.

2. The vehicle seat of claim 1, wherein the second fabric panel is adhesively bonded directly to the foam cushion.

3. The vehicle seat of claim 1, further comprising a second fastening element mounted with respect to the spacer fabric and engaged with the first fastening element.

4. The vehicle seat of claim 3, wherein the first and second fastening elements are hook and loop fastening elements.

5. The vehicle seat of claim 3, wherein one of the first and second fastening elements is a clip.

6. A vehicle seat comprising:
a lower seat portion;
a seatback portion operatively connected to the lower seat portion;
a foam cushion defining a cushion surface and a concavity that is open at the cushion surface;
a three dimensional spacer fabric having a first fabric panel, a second fabric panel operatively connected to the foam cushion and extending across the cavity, and a plurality of pile yarns resiliently biasing the first and second fabric panels from one another; and
a flexible cover having a surface that at least partially defines the outer surface of at least one of the lower seat portion and the seatback portion, said flexible cover being operatively connected to the first fabric layer; and
a first fastening element mounted with respect to the foam cushion and being at least partially disposed within the concavity; said first fastening element operatively connecting the spacer fabric to the foam cushion;
wherein the cover extends across the concavity; and
wherein the cover does not define a trench where the cover extends across the concavity.

7. The vehicle seat of claim 6, wherein the second fabric panel is adhesively bonded directly to the foam cushion.

8. The vehicle seat of claim 6, further comprising a second fastening element mounted with respect to the spacer fabric and engaged with the first fastening element.

9. The vehicle seat of claim 8, wherein the first and second fastening elements are hook and loop fastening elements.

10. The vehicle seat of claim 8, wherein one of the first and second fastening elements is a clip.

11. The vehicle seat of claim 6, wherein the foam cushion, the spacer fabric, and the flexible cover are part of the seatback portion.

12. A vehicle seat comprising:
a lower seat portion;
a seatback portion operatively connected to the lower seat portion;
a foam cushion defining a concavity; and
a three dimensional spacer fabric having a first fabric panel, a second fabric panel operatively connected to the foam cushion and extending across the concavity, and a plurality of pile yarns resiliently biasing the first and second fabric panels from one another;
a first fastening element mounted with respect to the foam cushion and being at least partially disposed within the concavity; said first fastening element operatively connecting the spacer fabric to the foam cushion; and
said first fabric panel defining at least part of the outer surface of at least one of the lower seat portion and the seatback portion;

wherein said first fabric panel does not define a trench where the three dimensional spacer fabric extends across the concavity.

13. The vehicle seat of claim 12, wherein the second fabric panel is adhesively bonded directly to the foam cushion.

14. The vehicle seat of claim 12, further comprising a second fastening element mounted with respect to the spacer fabric and engaged with the first fastening element.

15. The vehicle seat of claim 14, wherein the first and second fastening elements are hook and loop fastening elements.

16. The vehicle seat of claim 14, wherein one of the first and second fastening elements is a clip.

* * * * *